United States Patent [19]

Chester

[11] 4,031,856

[45] June 28, 1977

[54] SQUIRREL-PROOF POST

[76] Inventor: Russell L. Chester, Box 42, Fontana, Wis. 53125

[22] Filed: June 4, 1976

[21] Appl. No.: 693,045

[52] U.S. Cl. .............................. 119/51 R; 119/63
[51] Int. Cl.² ..................................... A01K 29/00
[58] Field of Search ............... 119/51 R, 52 R, 23, 119/26, 63, 59; D30/14, 15

[56] References Cited

UNITED STATES PATENTS

| | | | |
|---|---|---|---|
| 2,891,508 | 6/1959 | Bower | 119/51 R |
| 2,931,336 | 4/1960 | Cather | 119/51 R X |

FOREIGN PATENTS OR APPLICATIONS

| | | | |
|---|---|---|---|
| 61,778 | 5/1913 | Austria | 119/23 |

Primary Examiner—Hugh R. Chamblee
Attorney, Agent, or Firm—Joseph P. House, Jr.

[57] ABSTRACT

A squirrel-proof post comprises a post supporting a bird platform such as a bird feeder or bird house and has an axially elongated sleeve slidable on the post. Mechanism is provided to bias the sleeve toward the top of the post, such as a counterweight inside the post which is connected to the sleeve by a line which passes over a pulley at the top of the post. The counterweight is sufficient to lift the sleeve to the top of the post. However, when a squirrel climbs up the post and onto the sleeve, the weight is insufficient to support the combined weight of the sleeve and the squirrel, whereupon the sleeve carrying the squirrel will start to slide down the post and the squirrel will jump off and return to ground level. The counterweight will now lift the sleeve back to the top of the post. If the squirrel tries again to climb the post, the process will be repeated and the squirrel will be returned to the ground. This apparatus prevents the squirrel from gaining access to the bird platform.

9 Claims, 5 Drawing Figures

SQUIRREL-PROOF POST

BACKGROUND OF THE INVENTION

Bird feeders are typically invaded by squirrels and other marauding animals who climb up the post which supports the feeder above ground level and steal the feed or pre-empt the feeder so that the birds for which the feed is intended are denied access thereto. Prior art attempts to solve this problem typically involved provision for a guard about the post at a spacing slightly below the bird feeder, as for example, in U.S. Pat. No. 2,891,508. However, such guards have not always been successful and the squirrels frequently manage to circumvent the guard and climb thereover onto the feeder and steal the feed.

SUMMARY OF THE INVENTION

In accordance with the present invention, an axially elongaged sleeve is placed about the post and is slidable up and down on the post. Means such as a counterweight is utilized to bias the sleeve to a position at the top of the post. When a squirrel or other marauding animal climbs up the post and onto the sleeve, just before he reaches the bird feeder or other bird platform at the top of the post, the combined weight of the squirrel and the sleeve will overcome the bias of the counterweight and the sleeve with the squirrel passenger will slide down the post and the squirrel will be returned to the ground. The squirrel will typically jump off of the sleeve before it returns to ground level when the squirrel senses an insecure footing and the counterweight will then lift the sleeve back to its position at the top of the post. If the squirrel again climbs the post, the process will be repeated and the squirrel will never get beyond the sleeve at the top of the post. After several tries, the squirrel will become discouraged and will leave, unharmed.

Other objects, features and advantages of the invention will appear from the disclosure hereof.

DESCRIPTION OF THE PREFERRED EMBODIMENT

Figure 1:
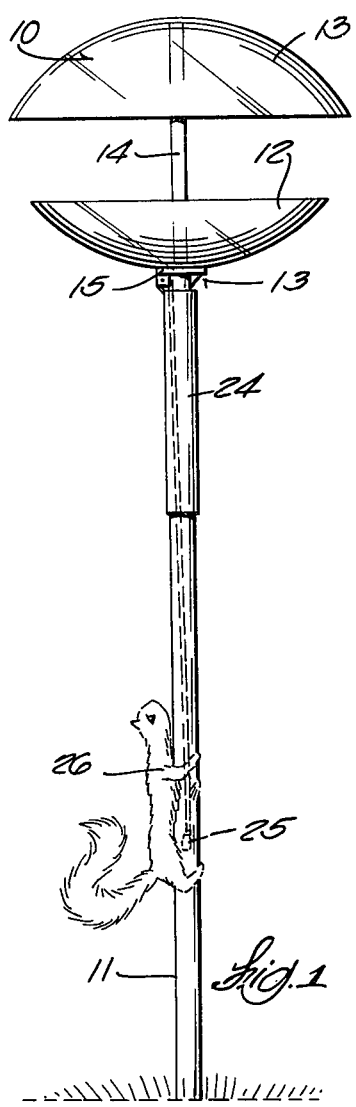
FIG. 1 is a side elevation illustrating a squirrel-proof post with the squirrel in the act of climbing up the post.
Figure 2:
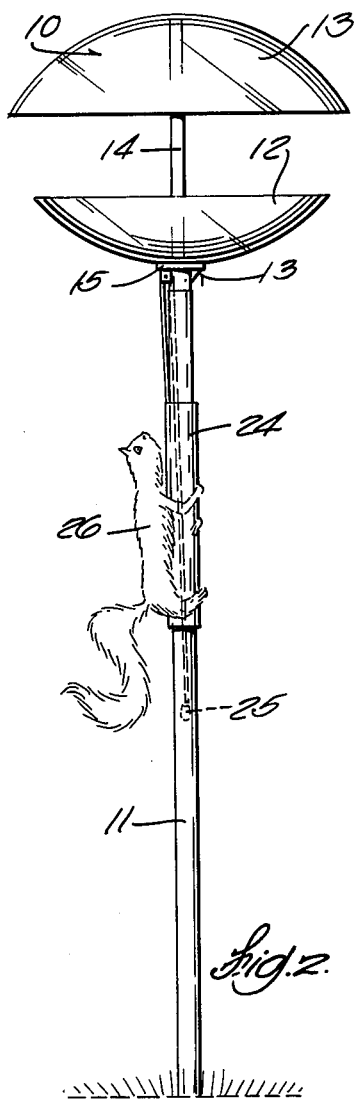
FIG. 2 is a view similar to FIG. 1, but showing the squirrel having climbed onto the sleeve and the sleeve starting down the post.
Figure 3:
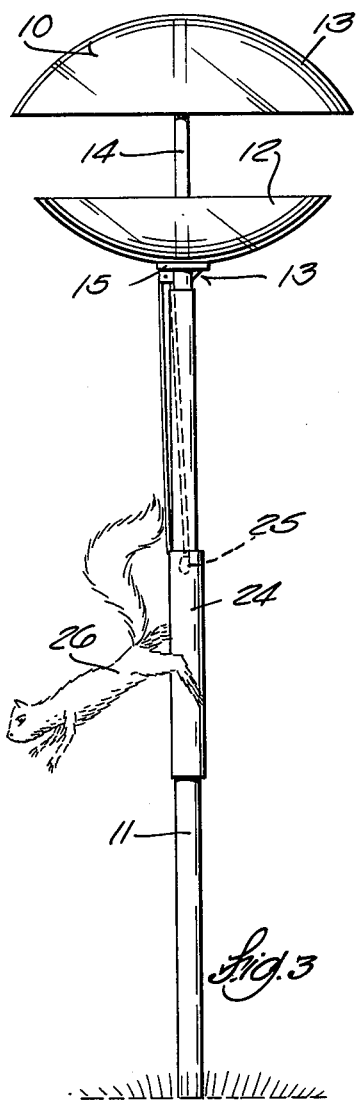
FIG. 3 is a view similar to FIGS. 1 and 2 in which the squirrel is jumping off the sleeve after it has slid down the post.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The device of the present invention is useful for protecting any elevated bird platform, such as the bird feeder 10 illustrated in the drawings. It may also be used to protect a bird house, etc.

The term "squirrel" as used herein is intended to be broad enough to apply to any rodent, varmint, or marauding animal, such as a cat, and especially squirrels, which are inclined to climb the post of a bird platform. The squirrel is the commonest example of such a marauder.

The post 11 is desirably fabricated out of a metal pipe or tube and has a hollow interior. It is usually supported in an upright position by inserting it into a pilot hole in the ground. The bird platform 10 at the top of the post and which is exemplified herein as a bird feeder, typically comprises a feed platform 12 over which a hood 13 may be supported on a center post 14. As before indicated, any other bird platform, such as a bird house, can be supported on the post 11.

In accordance with the present invention, the feed platform 12 is connected to the post 11 on a fitting 13 which includes a hollow tube portion 14 which is releasably and telescopically received with a slip fit into the pipe or post 11. At its upper end, the tube 14 of fitting 13 is provided with a bracket 15 to which the bird feeder platform 12 is attached, as by one or more bolts 16.

At one side of the tube 14, fitting 13 is provided with outwardly extending tabs 17 which are spaced apart and across which spans the shaft 20 of a pulley 21. The pulley 21 is desirably made of nylon or other plastic and the shaft 20 is made of metal with a permanent lubricant impregnated therein for rotation of the pulley 21 thereon.

A line 22, typically a plastic cord, is reeved over the pulley 21 and into and through the hollow tube 14 and the hollow post 11. One end of the line 22 is attached by a fitting 23 to an axially elongated plastic sleeve or collar 24 which is telescopically received over the post 11. The other end of the line 22 which is inside the post 11 is provided with a counterweight such as a lead sinker 25.

Sleeve 24 is typically made of a length of plastic tubing, for example, the plastic tubing utilized commercially to protect the shafts of golf clubs. Plastic sleeve 24 may be about 14 inches long so that it is normally longer than the distance between the front and rear legs of a squirrel 26.

Figure 4:
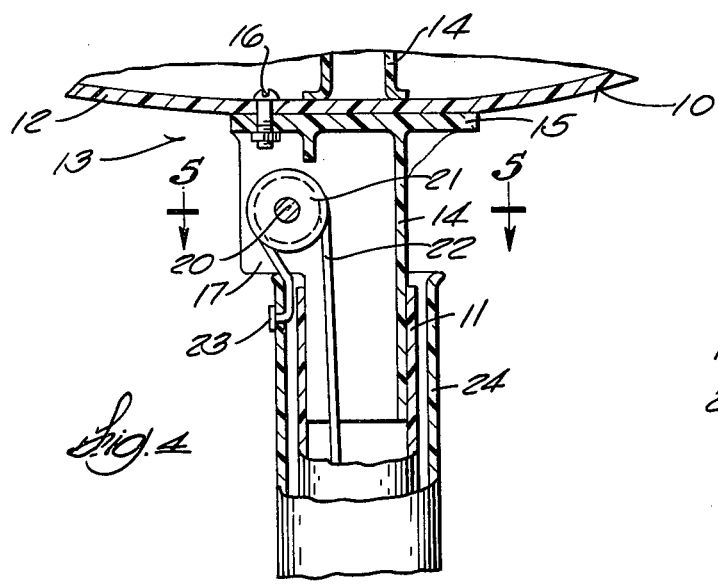
FIG. 4 is an enlarged fragmentary cross section through the fitting which interconnects the post with the bird platform.
Figure 5:
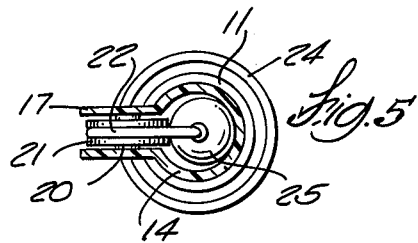
FIG. 5 is a cross section taken along the line 5—5 of FIG. 4.

The sinker 25 is selected to have sufficient weight to overcome the weight of the plastic sleeve 24 alone and, hence, to bias the sleeve 24 to its uppermost position on the post 11, as shown in FIG. 1. In such topmost position, the upper end of the sleeve 24 stops against the lower edges of the tabs 17, as illustrated in FIG. 4.

In use, a squirrel 26 will climb the post 11 in an attempt to mount the bird feeder tray 12 and steal the food therefrom. When the squirrel reaches the sleeve 24 and as he starts to climb onto the sleeve 24, the weight of the squirrel plus the weight of the sleeve will overcome the bias of the counterweight 25 and the sleeve 24 with the squirrel 28 riding thereon will start to slide down the post. Frequently, the squirrel will jump off of the sleeve and back onto the ground as soon as he feels the insecure footing, or he may ride down the sleeve until it nears ground level at which point he will jump off and will return to the ground. The weight 25 will then return the sleeve 24 back to the top of the post 11, as shown in FIG. 1. If the squirrel repeats his attempt to climb the post, the process will be repeated and the squirrel will be repeatedly returned to the ground level by the sleeve. The squirrel is unharmed by this process and soon becomes discouraged and leaves the scene.

In addition to effectively preventing the squirrel from climbing up on the tray 12, the device of the present invention provides entertainment for persons watching the squirrel climb up the post and watching the squirrel operate the sliding sleeve. The sleeve 24 is very little larger in diameter than the post and is usually made of the same color as the post so that it does not detract from the neat and uniform appearance of the bird feeder. Very little maintenance is required, as the moving parts are made of nylon or plastic. If the cord 22 is broken it is a simple repair job to replace it with a new cord. For this purpose, the fitting 14 is easily removed from its slip connection with the hollow post 11.

Sleeve 24 is one example of a squirrel carrier or car onto which the squirrel climbs as the squirrel nears the top of the post.

What is claimed is:

1. A squirrel-proof post comprising a post adapted to support a bird platform at the top of the post, squirrel carrier means slidably related to the post for up and down movement with respect to the post, said squirrel carrier means being dimensioned to receive a squirrel which climbs onto the carrier means to transfer his weight from the post to the carrier means, and means biasing the carrier means toward the top of the post, the bias of said biasing means being insufficient to sustain the weight of a squirrel which has climbed up the post and onto the carrier means, whereupon the carrier means and squirrel will slide down the post to a position in which the squirrel is out of jumping range to the bird platform.

2. The invention of claim 1 in which there is a fitting interconnecting the post and platform.

3. The invention of claim 2 in which the post is hollow, said fitting comprising a tube telescopically received within said hollow post.

4. The invention of claim 2 in which the means biasing the carrier toward the top of the post is connected to said fitting.

5. A squirrel-proof post comprising a post, a squirrel carrier slidably related to the post for up and down movement with respect to the post and means biasing the carrier toward the top of the post, the bias of said means being insufficient to sustain the weight of a squirrel which has climbed up the post and onto the carrier, whereupon the carrier and squirrel will slide down the post, said carrier comprising a sleeve about the post, said means comprising a pulley at the top of the post, a line attached at one end to the sleeve and reeved over the pulley and a weight at the other end of the line.

6. The invention of claim 5 in which said post is hollow, said weight and line being disposed inside the hollow post.

7. The invention of claim 5 in which there is a bird platform at the top of the post and a fitting interconnecting the post and platform, and a bearing between said fitting and said pulley.

8. The invention of claim 7 in which the post is hollow, said fitting comprising a hollow tube telescopically interconnected with the hollow post, said line passing over the pulley and through the hollow tube of the fitting and into the hollow post.

9. The invention of claim 8 in which the telescopic interconnection between the fitting and the hollow post comprises a releasable slip connection.

* * * * *